United States Patent [19]

Hierzenberger

[11] Patent Number: 4,611,557
[45] Date of Patent: Sep. 16, 1986

[54] INTERNAL-COMBUSTION ENGINE

[76] Inventor: Kurt Hierzenberger, Leoben, Austria

[21] Appl. No.: 781,436

[22] Filed: Sep. 27, 1985

[30] Foreign Application Priority Data

Sep. 28, 1984 [AT] Austria .................. 3094/84

[51] Int. Cl.⁴ .......................................... F02M 25/02
[52] U.S. Cl. ................... 123/25 B; 123/25 D; 123/25 E; 123/25 P
[58] Field of Search ............... 123/25 B, 25 D, 25 P, 123/25 E, 25 A

[56] References Cited

U.S. PATENT DOCUMENTS

| | | | |
|---|---|---|---|
| 1,068,414 | 7/1913 | Courtenay | 123/25 P |
| 1,791,523 | 2/1931 | Chaudet | 123/25 D |
| 3,983,882 | 10/1976 | Billings | 123/25 A |
| 4,030,453 | 6/1977 | Sugimoto | 123/25 P |
| 4,141,323 | 2/1979 | Hart | 123/25 B |
| 4,329,945 | 5/1982 | Beech et al. | 123/25 P |
| 4,368,711 | 1/1983 | Allen | 123/25 B |
| 4,388,893 | 6/1983 | Apfel | 123/25 E |
| 4,412,512 | 11/1983 | Cozzell | 123/25 E |
| 4,503,813 | 3/1985 | Lindberg | 123/25 E |

FOREIGN PATENT DOCUMENTS 601745  3/1926  France ................ 123/25 B

Primary Examiner—Ira S. Lazarus
Attorney, Agent, or Firm—Townsend and Townsend

[57] ABSTRACT

The combustion chamber of an internal-combustion engine is fed via a dispersion supply conduit with a dispersion of water and of fuel supplied via a fuel supply conduit and is fed via an air supply conduit with the air required for the combustion. The exhaust gases generated within the combustion chamber during the combustion are passed via an exhaust gas conduit into a heat exchanger being in connection with a condensate collecting chamber for receiving the condensate formed on cooling the hot exhaust gases and vapors. This condensate is utilized for the production of the fuel-water-dispersion. The heat of condensation being at disposal within the heat exchanger is utilized for heating the dispersion-air-mixture supplied into the combustion chamber of the internal-combustion engine or for heating the air required for the combustion.

17 Claims, 4 Drawing Figures

INTERNAL-COMBUSTION ENGINE

FIELD OF THE INVENTION

The invention refers to an internal-combustion engine comprising at least one combustion chamber, to which a dispersion of fuel and water is supplied via a dispersion supplying conduit and to which is supplied the air required for the combustion and which is in connection with an exhaust conduit serving for the removal of the effluent gases and vapours generated during the combustion. The fuel used can be a liquid fuel and a pulverulant fuel and optionally a gasified fuel, noting that also a combination of liquid fuel and pulverulant fuel can be used. The fuel used is in particular gasoline or a Diesel fuel.

The internal-combustion engine can be a reciprocating machine having within the combustion chamber at least one piston, but the internal-combustion engine can also consist of a turbine.

BACKGROUND OF THE INVENTION

In connection with internal combustion-engines it is already known to add water to the gasoline, which results in a fuel saving. For this purpose, a dispersion of fuel and water must be produced which is supplied to the combustion chamber in place of the pure fuel.

It has already been proposed to provide for the finished dispersion at petrol stations and to deliver the dispersion to correspondingly equipped vehicles. In this case, the dispersion is already produced in the refinery either by high pressure spraying or by means of supersonic dispersers. Such a dispersion can simply be produced and is of an excellent quality and allows a fuel saving up to approximately 35 percent. However, there exist numerous drawbacks which have forbidden up till now utilization of this system in practice. For example, the petrol stations must be equipped with separate tanks for storing this dispersion, noting that these tanks must consist of rust-proof materials in consideration of the corrosive action of the dispersion. Storing of the dispersion in these tanks is equally accompanied by problems, because the dispersions are, on the one hand, not freeze-proof and thus only suitable for being stored at temperatures down to approximately $-3°$ C. and have, on the other hand, an only limited storageability because the dispersion dissociates into its components after some time. Furthermore, the whole fuel system, including the fuel tank, of motor vehicles operated with such dispersions must be produced of corrosion-resistant material and must be replaced in existing vehicles. Finally, the great amounts of exhaust steam emitted by the exhaust equipment result in a deterioration of the environments. A further drawback of this system has its origin in the fact that all motor vehicles must be operated with a dispersion having one and the same ratio of fuel to water, because the petrol stations can only deliver such dispersions having a definite ratio of fuel to water.

It has also been proposed to supply to the combustion chambers of internal combustion engines not only fuel or, respectively, via a carburator a fuel-air-mixture but also water by an additional carburator or by an additional injection equipment. Also in this manner, a fuel saving up to approximately 40 percent can be achieved. In this case it is disadvantageous that an additional equipment must be provided in the shape of a second carburator or, respectively, an additional injection equipment and that, furthermore, a second tank must be provided for the water, which second tank must have considerable dimensions and results in filled condition in a substantial increase of the vehicle weight, because the necessary amount of water is substantially greater than the amount of fuel. A further disadvantage has its origin in the fact that distilled water must be used because normal tap water would within short result in clogging the nozzles within the carburator system or injection system. The use of distilled water results in an increase of the operating costs, so that—on account of a substantial amount of water being required—the savings in fuel costs are neutralized to a great extent.

From U.S. Pat. No. 4,412,512 there has further become known a fuel supply system in which the condensate obtained on cooling the hot exhaust gases and vapours is emulsified with the fuel and the emulsion obtained is supplied to an internal-combustion engine by means of an injection pump. The drawback of this known arrangement is the heat loss resulting on condensation of the steam within the exhaust system. This condensation heat corresponds to the heat of vaporization which is extracted from the combustion gases. This is the reason on account of which the known arrangements have in the mixing ratio an upper limit for the water of approximately 50 percent. If the mixing ration is increased above this value, the efficiency is reduced again.

OBJECTS OF THE INVENTION

It is an object of the present invention to provide an internal-combustion engine which can be operated with an optimum efficiency by means of a dispersion of fuel and water, thereby utilizing all advantages resulting from such operation. It is a further object of the present invention to design an internal-combustion engine such that its additional equipment and, respectively, its change-over requirements is reasonably limited and that, in particular, it can be avoided to provide for a second tank of great volumetric capacity for the water and to provide for a second carburator or, respectively, a second fuel injection pump equipment. A still further object of the invention is to design the internal-combustion engine such that operation thereof does not result in an increase of the environmental burden but in a reduction thereof. A further object of the invention is the improvement of the efficiency of the internal-combustion engine and the reduction of the emission of noxious substances via the exhaust system. The internal-combustion engine according to the invention shall further be designed such that existing internal-combustion engines can in a simple manner be changed over for operation with a fuel-water-dispersion. The mixing ratio between water and fuel shall be variable in a simple manner and be adaptable to the just existing requirements in connection with an internal-combustion engine according to the invention. The internal-combustion engine according to the invention shall further provide the possibility to utilize the hydrocarbons entering the exhaust system in an unburnt condition.

Figure 3:
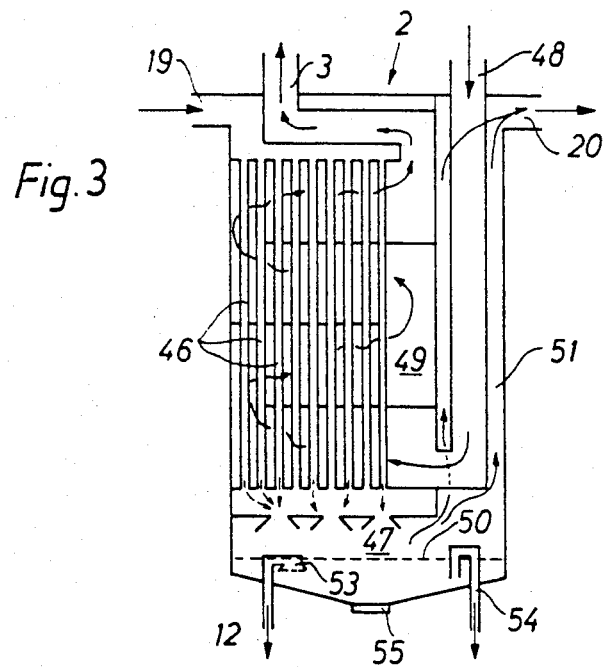
FIG. 3 shows in a section the heat exchanger of the internal-combustion engine according to the invention.

According to the embodiment shown in FIG. 1, fresh air is fed via an air filter 1 to a heat exchanger 2, the construction and the mode of operation of which will be explained later in detail. Within the heat exchanger 2, the fresh air is heated, whereupon the air is supplied to a carburator 4 via an air supply conduit 3. Heating is effected in a manner to be later described in detail by means of the hot exhaust gases and vapors of the motor 5.

The carburator 4 receives via a dispersion supply conduit 6 a fuel-water-dispersion which is produced within a dispersing means 7, the construction and the mode of operation of which is later explained in detail. For this purpose, there is fed fuel by means of a fuel pump 9 via a fuel supply conduit 10 from the fuel tank 8 to a control block 11 to which is also fed condensate by means of a condensate pump 13 via a condensate supply conduit 12. The condensate is formed—as is later described in detail—within the heat exchanger 2 and is collected within a condensate collecting chamber.

Figure 1:
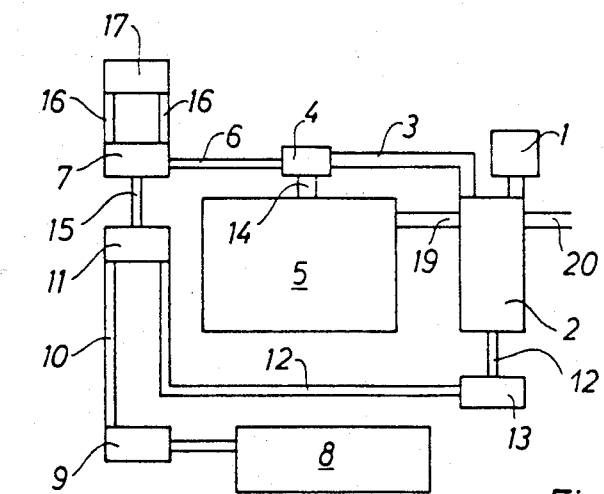
FIG. 1 shows, in principle, an embodiment of an internal-combustion engine according to the invention.

This embodiment shown in FIG. 1 is suitable for adding low proportions of water up to a maximum of approximately 50 percent, but has the advantage of simple construction, so that this embodiment provides the possibility to supplement in a simple manner already existing equipment.

Figure 1A:
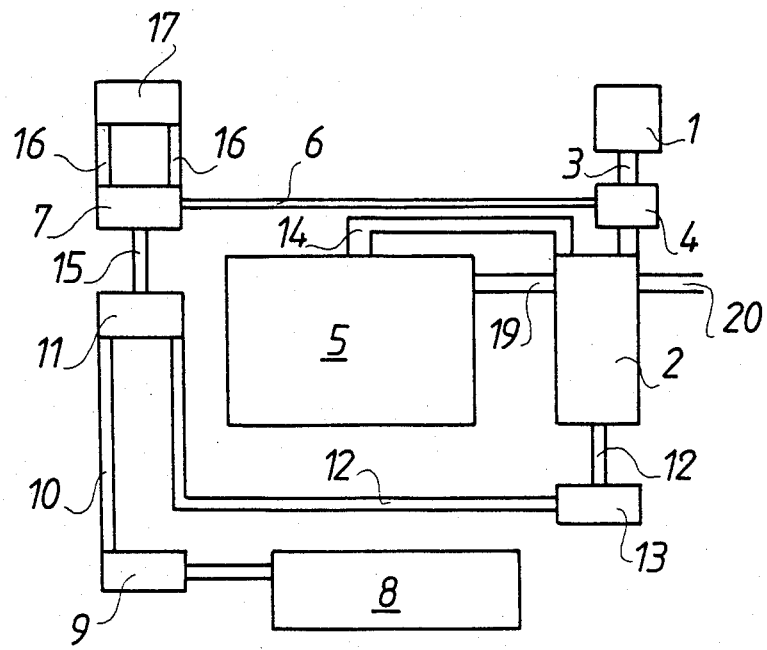
FIG. 1A shows, in principle, a further embodiment of an internal-combustion engine according to the invention.
Figure 2:
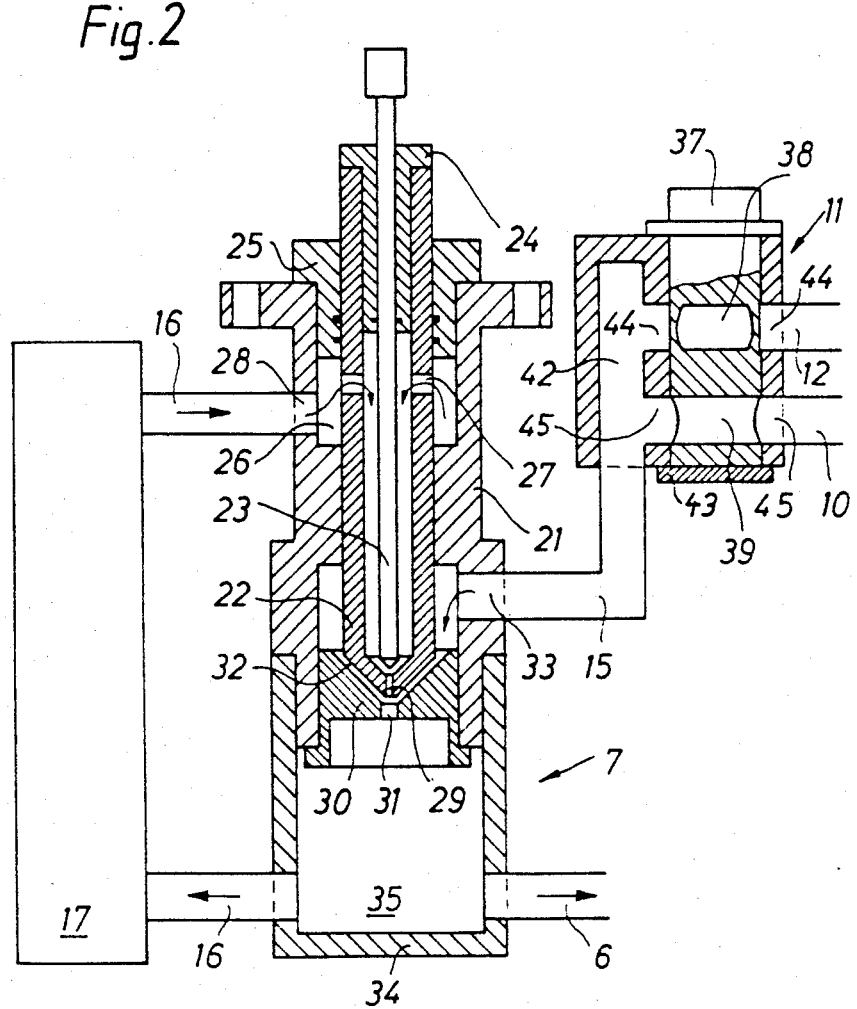
FIG. 2 shows a section through the control block and through the emulsifying means.

The embodiment according to FIG. 1A differs from the embodiment according to FIG. 1 by the fact that the carburator 4 is fed with a fuel-water-dispersion via the dispersion supply conduit 6 and is immediately fed with fresh air from the air filter 1 via the air supply conduit 3. The heat exchanger 2 is now fed with the dispersion-air-mixture formed within the carburator 4, noting that this mixture is heated within the heat exchanger and the dispersion is such evaporated prior to supplying the mixture via the conduit 14 into the combustion chamber of the motor 5. In place of using the carburator, the dispersion can also be injected into the heat exchanger 2 via an injection nozzle. This embodiment is suitable for very high proportions in water, but the geometric dimensions must be well coordinated relative to the gas velocities. Furthermore, a second throttle or, respectively, a second slide valve can become necessary within the conduit 14 in proximity of the motor 5 if too a great gas volume of the heat exchanger 2 results in an undesired increase of the response delay of the motor.

Also an embodiment comprising two heat exchangers is possible, noting that one heat exchanger is arranged upstream the carburator or, respectively, the injection nozzle and the second heat exchanger is arranged between the carburator or, respectively, the injection nozzle and the motor. Such an embodiment represents a combination of the embodiments shown in FIG. 1 and in FIG. 1A and is preferably used if particularly low outside temperatures are to be expected, because the air sucked in is preheated by the second heat exchanger located upstream the carburator 4 and thus the risk of icing is reduced.

The control block 11 consists of a rotatable slide valve 37 arranged within a housing and allowing to control the supplied fuel as well as the supplied condensate. Thus, within this control block 11 the mixing ratio between fuel and condensate is adjusted and both components are roughly pre-mixed, noting that it is possible to adjust definite mixing ratios of the fuel-water-dispersion even during operation of the internal combustion engine. In dependence on type and load condition of the motor, values within the range 9:1 (90 percent water) and approximately 24:1 (96 percent water) have proved suitable.

The mixture produced within the control block 11 is, via a conduit 15, fed to the dispersing means 7 and finally dispersed there. Any excess of dispersion is recycled to the entry side of the dispersing means via a cycling conduit 16 into which is interconnected a cycling pump 17. Thus, the amount of dispersion produced within the dispersing means 7 need not exactly be coordinated to the required amount and a certain excessive amount can be produced within the dispersing means 7, thereby making sure that on all operating conditions a sufficient amount of dispersion is at disposal for being supplied to the combustion chambers.

The dispersing means 7 is conveniently arranged directly on the motor 5, so that the dispersion required for the combustion is produced directly prior to the combustion process and the length of the dispersion supply conduit 6 can be kept short and phase separation of the dispersion is not possible.

The dispersion-air-mixture formed within the carburator 4 is fed into the combustion chamber of the motor 5 via the conduit 14, whereas discharge of the exhaust gases and vapors produced during the combustion is effected via the exhaust gas conduit 19, which leads to the heat exchanger 2 and from there via the tube 20, into which is interconnected in a manner known per se an exhaust silencer, into the free atmosphere.

Within the carburator 4, the dispersion is atomized and mixed with air like usual fuel. It is only necessary that the carburator is designed for the substantially greater amount of liquids, i.e. that, above all, the diameter of the nozzles must substantially be increased. Fine-mesh filters within the carburator can, however, be omitted, because also coarse contaminations can pass without problems through the nozzles of increased diameter. These great diameters have as a further effect that the tolerances with respect to the ratio between fuel or dispersion, respectively, and air can be greater, because any change of the supplied amount of emulsion is, within a broad range, scarcely of influence.

The fuel enters the motor in four phases:

1. Mainly as a gas, which is produced during evaporation after atomizing.
2. Finally distributed as particle within the water droplets formed during atomizing and in the film of dispersion flowing to the inlet valves along the walls of the intake elbow.
3. On account of the surface tension, part of the fuel particles arrives at the surface of the water droplets and forms there a thin film.
4. For a minor portion dissolved within the water.

As small as the amount of fuel dissolved in water might be, this amount is, however, of great importance. On the one hand, the freezing point is lowered down to some degrees below 0° C. and a compact ice structure is prevented and, on the other hand, the boiling point is increased and the phenomenon of delay of ebollution is provoked. If now the dispersion-air-mixture is compressed after having been sucked-in, the pressure curve does not correspond as usual nearly to the adiabatic line of air but extends with a reduced inclination because the water taken along absorbs part of the heat generated during compression and thereby evaporates and furthermore because the adiabatic exponent of the steam taken along is smaller than that of air. Therefore, the compression stroke consumes less energy than during usual operation. If the combustible gases are now ignited by the ignition spark of the spark plug, also the fuel films located on the surface of the dispersion droplets are ignited because they have, in comparison to the volume of compact gasoline droplets, a surface increased for several decimal powers.

This heats the already super-heated dispersion droplets, being in the condition of delay of ebollution, beyond the critical temperature, so that they suddenly explosively evaporate and disintegrate the fuel particles contained within the droplets into particles of molecular size and violently throw the fuel particles in all directions. This initiates some type of chain reaction, which propagates uniformely through the combustion chamber. Furthermore, the steam produced cleans the cylinder free of oil coke and carbon black, which are—at the prevailing temperatures—reacted in an endothermic reaction to hydrogen and carbon-monoxide. These substances are, on account of the high pressure and the high temperature, reacted with further steam to different hydrocarbons. Because a small portion of the water becomes additionally thermically dissociated, i.e. is decomposed into $H_2$ and $O_2$, but the gases are in the statu nascendi (i.e. atomic), a further graduated hydrogenation and oxidation occurs. Furthermore, the hot steam formed extracts from the system a great amount of heat, so that the peak temperatures are considerably lowered. The reactions taking place are not unlike those taking place in the gasoline syntheses according to Fischer-Tropsch and Kölbel-Engelhardt. The content in nitrogen oxide is thus strongly reduced and also the proportion of CO is kept small in spite of a rich mixture (Boudouard-equilibrium). The proportion of $CH_x$ in the exhaust gases is increased. The intrinsic antiknocking property of the motor is strongly increased so that also motors of a high compression ratio of 14:1 and still higher can easily be operated with lead-free fuels of low octane value. During the working stroke now following, the gases expand on account of their content of high pressure hot steam to a greater extent than in the normal Otto carburator engine.

As can be taken from FIG. 2, the slide valve 37 rotatably supported within the housing of the control block 11 is guided in longitudinal direction by a screwedly connected cover plate 43 and has a control bore 38, which is in connection, on the one hand, with the condensate supply conduit 12 via a bore 44 in the housing and, on the other hand, with a collecting chamber 42 within the control block 11. A further control bore 39 within the rotatable slide valve 37 is connected, on the one hand, with the fuel supply conduit 10 via a bore 45 within the housing and, on the other hand, with the mentioned collecting chamber 42. The collecting chamber 42 is in connection with the entry side of the dispersing means 7 via the mentioned conduit 15.

This dispersing means 7 has a housing 21, in which is arranged a main nozzle 22. Within the main nozzle 22, there is provided an adjustable nozzle needle 23, which is supported within a nozzle needle holder 24. By adjusting the nozzle needle 23, the flow velocity of the dispersion can be varied. The chamber 26, being sealed by a sealing sleeve 25, is in connection, on the one hand, with the main nozzle 22 via openings 27 and, on the other hand, with the cycling conduit 16 via an opening 28 in the housing.

That component part of the main nozzle 22 which comprises the nozzle opening 29 is surrounded by a mixing nozzle 30 having its nozzle opening 31 aligned with the nozzle opening 29, noting that the interstice 32 is in connection with the conduit 15 via an inlet opening 33. The dimension of the interstice 32 can be varied by varying the relative position between the main nozzle 22 and the mixing nozzle 30 within the housing 21, so that it is possible to make a basic adjustment. The fuel-water-dispersion formed by said both nozzles 22, 30 flows into the mixing chamber 35 defined by a component part 34 connected with the housing 21 and from there, on the one hand, to the carburator 4 via the dispersion supply conduit 6 and, on the other hand, to the entry side of the dispersing means 7 via the cycling conduit 16 and the opening 28 within the housing, so that any excessive dispersion is again recycled to the dispersing means 7.

The heat exchanger shown in FIG. 3 has a plurality of parallel and essentially vertical tubes 46 having their upper end connected with the exhaust gas conduit 19 and opening with their lower end into a condensate collecting chamber 47. A heating chamber 49 accommodating the tubes 46 is fed via a feed conduit 48 either with fresh air in the embodiment according to FIG. 1 or with a dispersion-air-mixture coming from the carburator 4 in the embodiment according to FIG. 1A. The fresh air or, respectively, the dispersion-air-mixture flows through this heating chamber 49 in counter-current and in upward direction and emerges from the heat exchanger 2 at the upper area thereof. In the embodiment according to FIG. 1, the heated fresh air is supplied to the carburator 4 via the air supply conduit 3, whereas in the embodiment according to FIG. 1A the heated dispersion-air-mixture, in which the dispersion is being evaporated, is supplied to the combustion chamber of the motor 5 via the conduit 14. As already mentioned, the hot exhahst gases and vapors removed via the exhaust conduit 19 are cooled within the heat exchanger, in which simultaneously the fresh air or, respectively, the dispersion-air-mixture is heated, so that the vapors are condensed and the condensate is collected within the condensate collecting chamber 47. The level of liquid within the condensate collecting chamber is indicated by the dashed line 50. The exhaust gases flow in upward direction via the channel 51 and then into the tube 20, in which is interconnected in a manner known per se an exhaust silencer, and then into the free atmosphere. Removal of the condensate from the condensate collecting chamber 47 via the condensate supply conduit 12 is effected at 53 within the area of the level 50 of the liquid, so that hydrocarbons floating on the condensed water are equally sucked off. Any excess of condensate is removed via an overflow 54. At the lowermost position of the condensate collecting chamber there is provided a closeable discharge opening 55 for emptying the condensate collecting chamber 47.

Within the heat exchanger 2 operated according to the counterflow principle, the steam is, in practice, completely condensed. The exhaust gases are thereby properly washed, so that also the unburnt hydrocarbons are nearly completely separated, because their boiling point is, as a rule, higher than that of water. These unburnt hydrocarbons are partially dissolved within the condensed water, but the major part floats on the surface of this distilled water as a thin film of oil, from where it is, as already mentioned, sucked off together with the condensed water being used for producing the dispersion, so that also these unburnt hydrocarbons are utilized. As already mentioned, heating of the dispersion-air-mixture takes place within the heat exchanger 2. For this procedure there is utilized the fact that the boiling point is increased with increasing pressure. On account of a higher pressure always being existent within the exhaust system than within the intake pipe, the dispersion contained within this dispersion-air-mixture evaporates by consuming the amount of heat delibrated by the steam condensing at a higher temperature within the exhaust gas system. In the internal-combustion engine according to the invention, the energy balance is just improved for this amount of energy, so that by using the heat exchanger 2 the efficiency is substantially increased.

The steam generated during the combustion of the dispersion-air-mixture within the combustion chamber of the motor 5 results in an effective internal cooling of the motor, so that in an internal-combustion engine according to the invention one can omit usual cooling means such as blowers, water coolers, oil coolers or cooling fans. It is even convenient to provide with a heat insulation the motor housing and/or the heat exchanger 2 together with the condensate collecting chamber 47 as well as, if desired, further condensate-containing parts of the equipment. Thereby, the heating periods are shortened and the sound emission is reduced, on the one hand, and freezing of the condensate at low temperatures is prevented, on the other hand. For preventing such freezing and, respectively, for thawing a condensate already frozen on account of extremely low temperatures, the mentioned component parts of the equipment, above all also the condensate collecting chamber 47, can be provided with heating means. Conveniently there are used electric heating means which are energized by the vehicle battery and which effect heating of these component parts and the media contained therein.

The theoretic fundamentals in the operation of the internal-combustion engine according to the invention are as follows:

Because an internal-combustion engine can exclusively use the pressure difference between the expanded combustion gas and the ambient air, it seems that the high temperatures generated during the combustion are disadvantageous because they result in a high stress of the materials.

These high temperatures are, however, actually necessary because the combustion does not result in an increase of volume but even in a small reduction of volume. According to stoichiometric laws there result from 10.8 l fuel-air-mixture sucked in only 10 l exhaust gas if equally measured on normal conditions. The loss in volume is thus approximately 7.4 percent. This indicates that the pressure increase or, respectively, increase in volume within the motor is only based on the extreme temperature increase during the combustion. The increase of pressure and volume, respectively, can be calculated by means of the laws of nature.

The present invention makes use of the fact that, as can be taken from pertinent tables, 1 l of gasoline provides sufficient heat energy to convert approximately 15 l water to steam. In practice, tests have shown that even fuel-water-dispersions having a respective ratio of 1:20 could be burnt without problems within the motor and could not be expanded by this motor to such an extent that condensation occurred. According to the present invention, this heat energy is utilized for evaporating the water dispersed with the fuel, noting that the steam effects the major part of the expansion work and thus provides for moving the piston or, respectively, the turbine blades in a similar manner as in a steam engine.

The present invention provides the possibility to change over without difficulties and without substantial expenditure any existing internal-combustion engine for operating this engine with a fuel-water-dispersion. In a carburator engine, for example, it is only necessary to install the heat exchanger together with the condensate collecting chamber and preferably together with the condensate pump, the dispersing means and the required connecting conduits and to enlarge the nozzles of the existing carburator such that the substantially increased amounts of liquid can pass through these nozzles. In compensation therefor it is no more necessary to provide fine-mesh filters, because even contaminations having a diameter of 1.5 mm, which contaminations would immediately clog a normal carburator, may pass these nozzles of increased diameter without causing troubles.

What I claim is:

1. An internal-combustion engine comprising at least one combustion chamber to which a dispersion of fuel and water is supplied via a dispersion supply conduit and to which is supplied the air required for the combustion and which is in connection with an exhaust gas conduit serving for the removal of the exhaust gases and vapors generated during the combustion, a heat exchanger being interconnected into said exhaust gas conduit, condensation of the water contained in the exhaust gases and vapors taking place in said heat exchanger with simultaneous heating of the air required for the combustion, noting that a condensate collecting chamber for receiving the condensed water is provided and connected with the entry side of a dispersing means via a condensate supply conduit, the fuel supplied via a fuel supply conduit being dispersed with water within this dispersing means, the outlet side of which is in connection with the dispersion supply conduit.

2. Internal-combustion engine as claimed in claim 1, wherein within the heat exchanger is heated the dispersion-air-mixture subsequently to be fed into the combustion chamber of the internal-combustion engine.

3. Internal-combustion engine as claimed in claim 1, wherein a condensate pump is interconnected into the condensate supply conduit.

4. Internal-combustion engine as claimed in claim 1, wherein the dispersing means is preceded by a control block within which fuel and water are premixed and the ratio between fuel and water is adjusted and the outlet side of which is, via a conduit, in connection with the entry side of the dispersing means.

5. Internal-combustion engine as claimed in claim 1, wherein the dispersing means is directly mounted on the internal-combustion engine.

6. Internal-combustion engine as claimed in claim 1, wherein a chamber containing the dispersion is in connection with the entry side of the dispersing means via a cycling conduit.

7. Internal-combustion engine as claimed in claim 6, wherein a cycling pump is interconnected into the cycling conduit.

8. Internal-combustion engine as claimed in claim 1, wherein the condensate supply conduit opens into the condensate collecting chamber in its upper area.

9. Internal-combustion engine as claimed in claim 1, wherein the dispersing means has a housing in which is arranged a main nozzle connected with the conduit coming from the control block and having its component part comprising the nozzle opening outwardly surrounded by a mixing nozzle, the nozzle opening of which is in alignment with the nozzle opening of the main nozzle, noting that the interstice between the outer side of the component part, comprising the nozzle opening, of the main nozzle and the inner side of the component part, having the nozzle opening, of the mixing nozzle is in connection with the dispersion supply conduit.

10. Internal-combustion engine as claimed in claim 9, wherein an adjustable nozzle needle is provided within the main nozzle.

11. Internal-combustion engine as claimed in claim 9, wherein the main nozzle is designed as an insert member adjustably arranged within the housing.

12. Internal-combustion engine as claimed in claim 1, wherein the heat exchanger has substantially vertical tubes parallely arranged one relative to the other and being at their upper ends connected with the exhaust gas conduit and opening at their lower end into the condensate collecting chamber, said tubes being arranged within a chamber which is connected at its lower area with a feed conduit for the supply of the media to be heated and which is connected at its upper area with a discharge conduit for discharging the heated medium.

13. Internal-combustion engine as claimed in claim 1, wherein the housing of the internal-combustion engine is provided with a heat insulation.

14. Internal-combustion engine as claimed in claim 1, wherein the condensate-containing component parts are at least partially provided with a heat insulation.

15. Internal-combustion engine as claimed in claim 14, wherein the heat exchanger together with the condensate collecting chamber is provided with a heat insulation.

16. Internal-combustion engine as claimed in claim 1, wherein the condensate-containing component parts are at least partially equipped with heating means.

17. Internal-combustion engine as claimed in claim 16, wherein the condensate collecting chamber is equipped with a heating means.

* * * * *